UNITED STATES PATENT OFFICE 2,589,734

PRODUCTION OF POTASSIUM-CONTAINING NITROPHOSPHATES

Samuel Ruesch, Visp, Switzerland

No Drawing. Application May 6, 1948, Serial No. 25,517. In Switzerland May 29, 1947

5 Claims. (Cl. 71—39)

It is known to produce potassium-containing nitrophosphates of low water content. For this purpose, crude phosphates are decomposed with concentrated nitric acid and potassium salts are added to the masses before or after decomposition. The melting point is easily depressed by the addition of potassium salts so that products are obtained with low softening points, which products cannot easily be granulated and give fertilisers which can neither be stored nor distributed. Attempts have therefore been made to produce products with as high as possible a softening point. For good quality of the end product and especially for as high as possible a softening point, it had hitherto been though that it was only necessary that there should be at least one mol of an alkali salt per 5 mols of calcium nitrate contained in the end product, and at most 2.3 of water of crystallisation per mol of calcium nitrate, and that the quality of the end product was not influenced by the manner and method of preparation.

It has now been found that when the known process is carried out on a large commercial scale, various difficulties arise in the production of potassium-containing nitrophosphates of low water content when using potassium sulphate as the potassium component. The masses so produced do not have the desired high softening point and do not solidify rapidly enough to make them capable of being granulated with advantage. Extensive experiments have shown that, by adding potassium sulphate to the nitrophosphate decomposition masses, reaction products are produced by partial double decomposition which contain the salts $Ca(NO_3)_2$, $Ca(H_2PO_4)_2$, $KNO_3$, $K_2SO_4$ and $CaSO_4$. This multi-component system, under predetermined working conditions, can lead to the formation of complex salts which extensively modify the properties and especially the softening temperatures of the end products. The previous rule that the formation of a double salt of the formula $$5Ca(NO_3)_2.10H_2O.KNO_3$$

must be induced, no longer applies when the above-mentioned components are present, since quite different molecular proportions lead to the most favourable results, i. e. to products of high softening point. Thus for example it has been found that a decomposition mass, in which an end product of the molecular proportions $$2Ca(NO_3)_2 : 1Ca(H_2PO_4)_2 : 1KNO_3 :$$
$$0.5K_2SO_4 : 0.5CaSO_4$$

is formed by a partial double decomposition with potassium sulphate, gives the best results and makes it possible to increase the softening temperature to 70° C. from, for example, 38° C.

It has now been found that such potassium-containing nitrophosphates of low water content and high softening point can be produced in granular form by decomposing the phosphates with nitric acid, for example with concentrated nitric acid of about 72%, and adding potassium sulphate, provided that quite definite conditions and measures are observed and followed. The following conditions must be observed in order to obtain products of the above-mentioned properties and to produce rapidly hardening and stable end products:

(a) The degree of decomposition of the nitrophosphate decomposition mass must be so regulated that the content of water soluble phosphoric acid calculated as $P_2O_5$ does not exceed 85% and preferably lies between 83 and 84%. Regulation may be effected by measuring the quantities of acid in relation to the crude phosphate.

(b) The quantity of potassium sulphate added must be such that the end product contains 5–14%, preferably 7–10%, of $K_2O$.

(c) The potassium sulphate must not be added to the decomposition mass until the content of free acid therein amounts to no more than about 3% $HNO_3$, or has sunk below 3% $HNO_3$.

(d) After addition of potassium sulphate the decomposition product must be intensively mixed or kneaded within the temperature range 80–90° C. preferably 80–85° C. The duration of the kneading is determined by the efficiency of the mixing. It amounts to about half an hour and in certain circumstances may amount to one or more hours.

If these conditions are not observed, i. e. if the decomposition mass is only kneaded for a short time in known manner with the potassium sulphate with cooling, products are obtained with considerably lower softening points than the products of the invention. Thus, for example the above mentioned manner of working carried out with potassium sulphate as the potassium component leads, as the content of $K_2O$ increases, to end products which have the following softening temperatures as compared to those of the products produced according to previously known processes.

| Per cent $K_2O$ in the finished product | Nitrophosphate+$K_2SO_4$ Softening Temperatures— ||
|---|---|---|
| | Working according to the invention | Known method of working without kneading at 80–90°C |
| | °C. | °C. |
| 0 | 37 | 37 |
| 2.4 | 39 | 38 |
| 4 | 40 | 38 |
| 6 | 63 | 38 |
| 7 | 70 | |
| 8 | 72 | 38 |
| 10 | 71 | |
| 12 | 65 | 38 |
| 14 | 57 | 38 |
| 16 | 40 | 38 |

From the above results it will be seen that a hitherto unknown sharply marked maximum is found between 5 and 14% $K_2O$ in the end product, which maximum gives a softening temperature of about 72° C. for 8–9% $K_2O$. The above temperatures may vary within narrow limits according to the kind of crude phosphate employed, the degree of decomposition and the water content, but a pronounced maximum is always shown with the above mentioned potassium content.

The content of free acid in the decomposition mass is a measure of how strongly the product has already been decomposed by the nitric acid. This content is of course dependent on the degree of decomposition, as more strongly decomposed products show initially a higher content of free acid than do less strongly decomposed products. Since the addition according to the invention of potassium sulphate leads to an increase of the softening point, the initial quantities must be such, as already mentioned under point c, that the free acid amounts at most to 3%, i. e. the nitric acid must for the greatest part be in the form of calcium nitrate. For this purpose, if the content of free acid is too high, the decomposition mass can be kneaded sufficiently long and intensively prior to the addition of potassium sulphate, or the free acid can be neutralised with chalk to the desired degree.

Additions of potassium sulphate give the masses quite a different behaviour from those given by additions of potassium nitrate. The latter give masses which have a maximum softening point of about 62° C. in the neighbourhood of double salt proportions of $$5Ca(NO_3)_2.10H_2O.KNO_3$$

i. e., with a ratio of $$\frac{Ca(NO_3)_2}{KNO_3} = 5$$

which corresponds to a content of 2–3% $K_2O$ in the end product. As the content of $K_2O$ in the end product increases the softening point of the masses sinks again to about 40° C. When working according to the method of the invention, the use of potassium sulphate quite surprisingly gives wholly different results from those obtained by using potassium nitrate, which latter has hitherto been preferred for practical use since hitherto potassium sulphate gave worse results.

The decomposition of the phosphates can be carried out with concentrated, for example 72%, nitric acid or with diluted, for example 50%, nitric acid. In the first case the necessary products of low water content are obtained directly. When using diluted nitric acid foamy products rich in water are first obtained which must thereafter be dried. This can be done by leading a stream of warm air through the mass until the product has been sufficiently dehydrated. The decomposition mass of low water content thus produced is then further treated according to the invention. For this purpose the mass is introduced into a kneading machine and kneaded intensively at 80–99° C., as set out under d above, with the necessary quantity of potassium sulphate. The kneaded mass is then submitted to a granulating treatment in known manner. When working on a commercial scale the process of the invention represents a considerable technical advance, since the output of the apparatus can be much increased compared to the known processes. Because of the high softening point the doughy pasty decomposition products set and solidify more easily and more quickly than products of lower softening point, so that in the same granulating process the output can be doubled. The products may be stored and distributed better than hitherto, since they have a very compact grain with a high cleavage pressure and do not clog on distribution.

The invention also offers the economic advantage that it makes possible the use of potassium sulphate in place of potassium nitrate, which was hitherto used for addition to nitrophosphates. Potassium sulphate is much cheaper than potassium nitrate since the latter must be produced in an expensive manner from potassium sulphate or potassium chloride. Technical strongly impure potassium sulphate can be used with good effect.

It has further been found that the reaction masses of the present process can also contain small quantities of boron compounds in addition to potassium sulphate. When the boron-containing mass is kneaded intensively at at least 80° C. for a considerable time, the decomposition and working up conditions otherwise being the same, products are obtained which also possess a high softening point. This is of importance because boron compounds, for example boric acid, normally produce a considerable lowering of the softening point and thus have a deleterious effect on potassium nitrophosphate fertilisers, since the boric acid retards chemical double decomposition reactions in the decomposition masses. Since the softening temperature of the products falls with an increase in the boron content, the boron-containing masses must be kneaded all the longer the greater are the additions of boric acid. Thus for example when producing pure potassium nitrophosphate a kneading time of one hour is sufficient to obtain a product with a softening temperature of 70° C. In order to obtain the same softening temperature with 0.45% boric acid added to the same potassium nitrophosphate mixture, kneading must be continued for two hours under conditions which are otherwise the same. The kneading time at at least 80° C. depends inter alia on the composition of the mass and on the efficiency of the kneading and is determined by the effect to be obtained as regards the increase of the softening temperature. It amounts for example to 1–2 hours or even more. The additions of boron compounds are small, for example 0.1–1% and preferably 0.1–0.3% of boron. The additions may be made to the reaction mass before or after decomposition. Boron compounds which may be employed include all those which are soluble, such as for example boric acid, borax, etc. They are of particular importance in agriculture for combatting certain diseases such as heart rot and dry rot.

*Examples*

1. 467 kgms. of Morocco phosphate and 328 kgms. of 72.8% nitric acid, calculated as 100%, were introduced into a stirring decomposition mechanism and mixed in known manner. A pasty, doughy hot mass was formed having a temperature of about 70° C. and a content of free acid after about 40 minutes' stirring of about 2.5% $HNO_3$. 185 kgms. of technical potassium sulphate (48% $H_2O$, 1.6% $Na_2O$ and 1.35% Cl) were added and the mass was intensively kneaded for about half an hour at 80–85° C. A thick dough was formed which was converted into granular form in known manner, for example by pressing through perforated plates and granulating in drums with addition of dusty end product or by crumbling with comminuting worms. The product obtained had the following composition: Total P₂O₅ 15.07%; water soluble P₂O₅ 12.59%; nitrogen 6.85%; K₂O 8.83%. The degree of decomposition, i. e. the ratio of water soluble P₂O₅ to total P₂O₅ amounted to 83.5%. The softening point was approximately 70° C.

2. 117 kgms. of Morocco phosphate and 82 kgms. of 72.8% nitric acid, calculated as 100%, were introduced into a stirring decomposition mechanism and stirred vigorously for a few minutes. The pasty mass produced was let off periodically into a kneading machine with simultaneous addition of 46 kgms. of technical potassium sulphate. The thick doughy mass was intensively kneaded constantly at 80–85° C. The addition of the decomposition product was regulated so that the reaction mass remained in the kneading mechanism for at least ½–1 hour. The dough was expelled continuously from the kneading mechanism by an overflow and converted in known manner into the granular form. The product obtained has the following composition: Total P₂O₅ 15.1%; water soluble P₂O₅ 12.4%; nitrogen 6.75%; K₂O 8.5%. The degree of decomposition amounted to 82.2%. The softening temperature was about 68° C.

3. 467 kgms. Morocco phosphate and 328 kgms. of 50% nitric acid, calculated as 100%, were introduced into a stirring mechanism and stirred very vigorously for a short time. The foamy decomposition mass produced had the following composition: Total P₂O₅ 15.0%; water soluble P₂O₅ 12.7%; nitrogen 6.4%. The degree of decomposition amounted to 84.8%. The foamy mass, which had a specific gravity of about 0.6, was dried in a suitable apparatus by passing warm air through it. The loss in weight due to drying amounted to about 19%. The nitrophosphate obtained had the following composition: Total P₂O₅ 18.5%; water soluble P₂O₅ 15.5%; degree of decomposition 83.8%; nitrogen content 7.8%. The dried product was introduced into a kneading machine or into a comminuting worm and after addition of 184 kgms. of technical potassium sulphate was vigorously kneaded for 30 minutes at 80–85° C. The thick doughy mass produced was granulated in known manner. The product obtained had the following composition: Total P₂O₅ 15.5%; water soluble P₂O₅ 12.6%; nitrogen 6.4%; K₂O 8.6%. The degree of decomposition amounted to 83.2% and the softening temperature of the granulated product was about 70° C.

4. 450 kgms. of Morocco phosphate containing 33.4% P₂O₅ and 335 kgms. of 72.4% nitric acid, calculated as 100% acid, were introduced into a stirring decomposition mechanism and decomposed in known manner The. doughy decomposition mass had a temperature of about 70–75° C. and after about 40 minutes mixing contained about 2.8% free HNO₃ 180 kgms. of technical potassium sulphate (48–52% K₂O, 1.0% Na₂O and 1.3% Cl) were then introduced followed by 25 kgms. of boric acid (H₃BO₃) and the reaction mass was further intimately mixed whilst maintaining the temperature at approximately 80° C. After about two hours mechanical working, the thick dough was converted into granular form in known manner in drums or comminutors with the addition of dusty end product. The reaction product obtained had the following composition:

| | Per cent |
|---|---|
| Total P₂O₅ | 14.8 |
| Water soluble P₂O₅ | 12.17 |
| Nitrogen | 6.89 |
| K₂O | 8.19 |
| Boron | 0.44 |

The degree of decomposition, i. e. the ratio of water soluble P₂O₅ to total P₂O₅ amounted to 82.3%. The product contained 2.2% free HNO₃ and softened at 72° C.

I claim:

1. In a process for the production in granular form of potassium-containing nitrophosphates of low water content and high softening point by decomposing phosphate rock with an amount of HNO₃ theoretically required to convert 80–85% of the total P₂O₅ of the phosphate rock to water soluble form and to obtain products with at most 2–3 mols of water of crystallization per mol of calcium nitrate, by adding potassium sulphate, kneading the mixture and converting the hot doughy mass by cooling and hardening into granular form; the improvement comprising the steps of kneading said decomposition mass intensively until the content of free acid in the mass is below 3%, adding to said mass a quantity of potassium sulphate whereby the mixed product contains 5–14% K₂O, and intensively kneading said mixed product at a temperature of at least 80° C.

2. In a process according to claim 1, in which the step of neutralizing the free acid in the mass with chalk is carried out until the content of free acid is below 3%.

3. In a process according to claim 1, in which the step of decomposing the phosphate rock with a dilute nitric acid and directing a current of warm air through the foaming decomposition mass is carried out until the content of water is at most 2–3 mols of water of crystallization per mol of calcium nitrate.

4. In a process according to claim 1, in which 0.1–1% boron in the form of boric acid is added to the said reaction mass before the decomposition with nitric acid.

5. In a process according to claim 1, in which 0.1–1% boron in the form of boric acid is added to the said reaction mass after the decomposition with nitric acid.

SAMUEL RUOSCH.

REFERENCES CITED

The following references are of record in the file of this patent:

UNITED STATES PATENTS

| Number | Name | Date |
|---|---|---|
| 1,058,145 | Braun | Apr. 8, 1913 |
| 1,409,126 | Free | Mar. 7, 1922 |
| 1,950,945 | Luscher | Mar. 13, 1934 |
| 1,971,111 | Luscher | Aug. 21, 1934 |
| 2,069,731 | Trumpler | Feb. 2, 1937 |

FOREIGN PATENTS

| Number | Country | Date |
|---|---|---|
| 788,981 | France | Aug. 5, 1935 |
| 810,165 | France | Mar. 17, 1937 |